Oct. 4, 1927.
J. M. CROWE
1,644,326
PORTABLE MOTOR DRIVEN SAW
Filed April 2, 1925    2 Sheets-Sheet 1
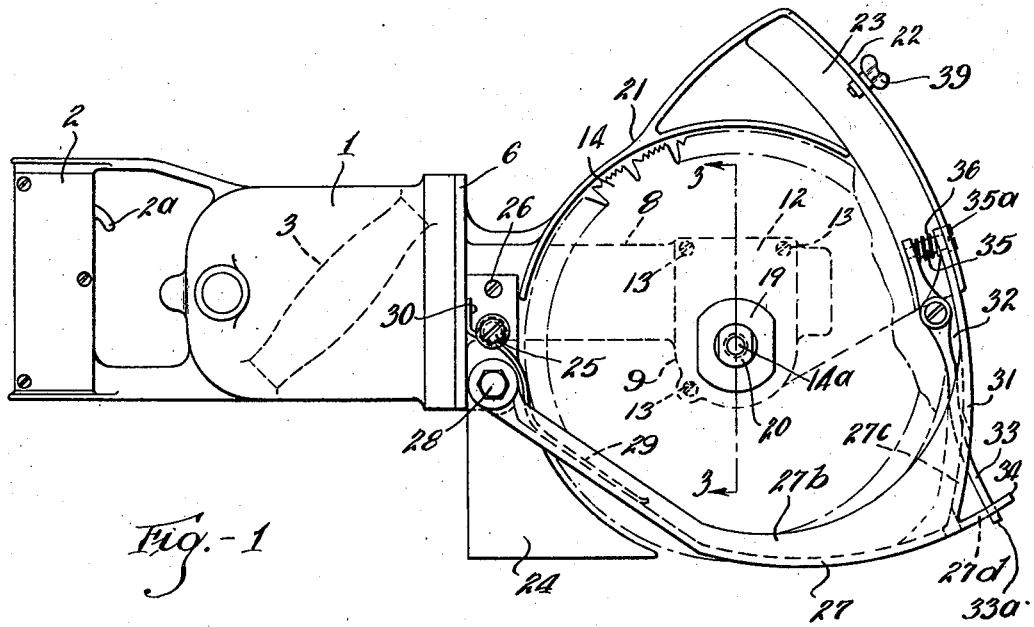
Inventor
John M. Crowe
By Brockett, Hyde & Milburn
Attorneys

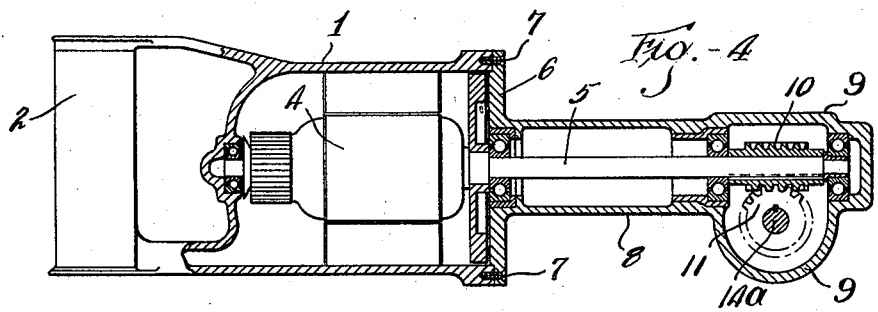
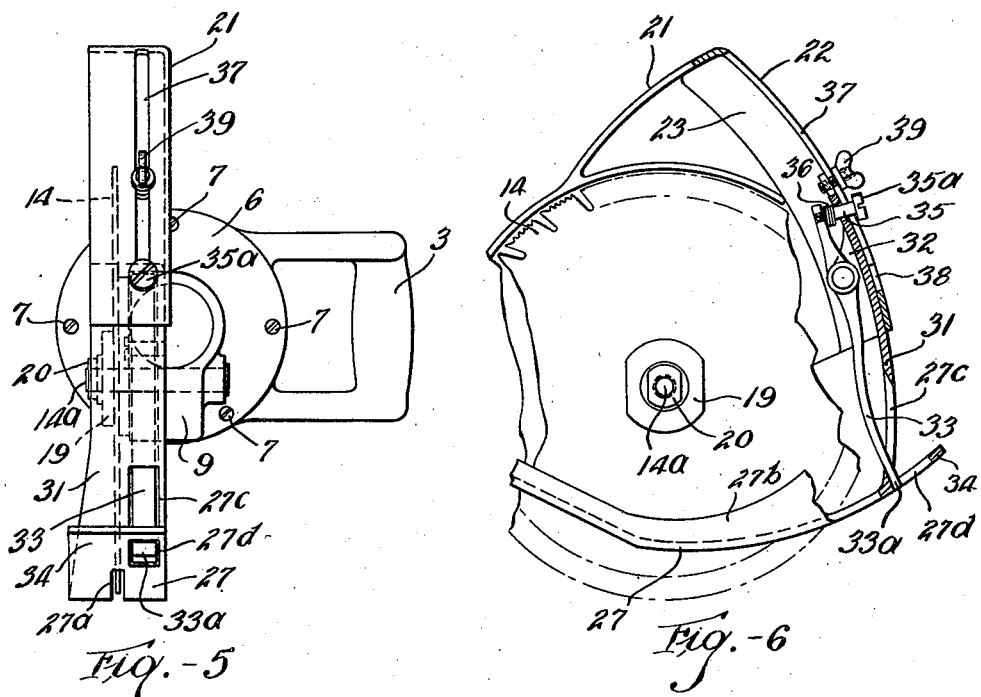
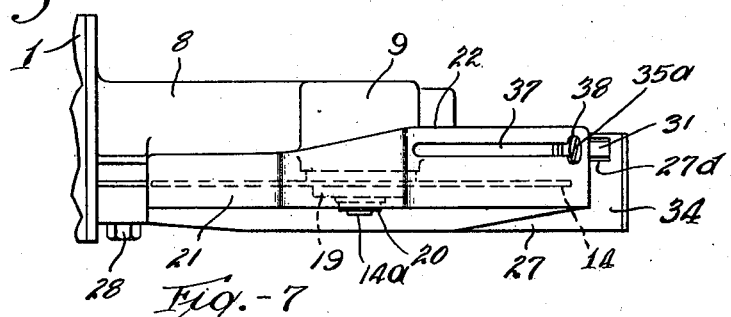

Patented Oct. 4, 1927.

1,644,326

UNITED STATES PATENT OFFICE.

JOHN M. CROWE, OF KENTON COUNTY, KENTUCKY, ASSIGNOR TO THE CROWE MANUFACTURING CORPORATION, OF COVINGTON, KENTUCKY, A CORPORATION OF KENTUCKY.

PORTABLE MOTOR-DRIVEN SAW.

Application filed April 2, 1925. Serial No. 20,115.

This invention relates to improvements in portable motor driven tools such as saws.

One object of the present invention is to provide a saw of this type with an improved arrangement of handles whereby the handling and manipulation of the saw may be greatly facilitated.

Another object is to provide an improved adjustable depth gauge as part of such a saw structure.

Another object consists in the provision of an improved guard means for protecting the operator against accidental contact with the edge of the saw blade regardless of the position of the saw; and, more specifically, to provide movable guarding means, which forms a part of the guard means referred to, tending at all times to assume guarding position, and releasable locking means to positively maintain the guarding means in guarding position subject to the will of the operator.

Another object is the provision for the locking means referred to, of releasing means adapted for actuation by engagement of the saw with the work, for allowing the guarding means referred to to uncover a portion of the saw blade for the cutting operation.

Another object is to provide an improved adjustable combined depth gauge and guard means, thereby simplifying the structure and at the same time increasing its efficiency.

A still further object is to provide an improved combination of a depth gauge and guard and a kerf blade, which kerf blade serves to guide the saw through the work and at the same time supplements the guarding means because of the relative arrangement thereof.

Other objects will appear from the following description and claims when considered together with the accompanying drawings.

Fig. 1 shows my improved saw structure in side elevation; Fig. 2 is an inverted plan view of the same; Fig. 3 is a detail view of the gear hub for driving the saw; Fig. 4 is a longitudinal sectional view taken on line 4—4 Fig. 2; Fig. 5 is a front elevation of the saw; Fig. 6 is a detailed view partly in section showing the stop means for limiting the movement of guard or depth gauge; and Fig. 7 is a plan view of the forward end portion of the saw.

The casing 1 which encloses an electric motor for driving the saw is provided with a rear handle 2 on the end thereof and a second handle 3 on the left side thereof. The motor is controlled by the switch 2ª on the handle 2. The handle 3 is arranged angularly for greater convenience and ease in handling and manipulating the saw, this handle in the present case being shown as extending at an angle of approximately 45° with respect to the path of travel of the saw through the work. The rotor 4 of the electric motor together with the shaft 5 driven thereby are mounted in suitable bearings in the casing, as illustrated in Fig. 4. The casing which is entirely closed except for the front end thereof, is provided with a cover 6 having detachable connection therewith by means of screws 7. Formed integrally with the cover or end plate 6 there is provided the housing or casing 8 for enclosing the shaft 5 as well as the bearings thereof, as clearly illustrated in Fig. 4. The housing 8 is provided also with an integral gear box 9 for enclosing the gear 10 on the shaft 5 and the gear 11 which meshes therewith and is driven thereby. The gear box 9 which is otherwise closed, has one open side which is provided with a closure plate 12 secured by means of the three screws 13 at the points indicated in the drawing. The plate 12 has a circular opening through which extends the stub shaft 14ª and upon which is mounted the hub 15 formed with the gear 11. This hub extends out through the opening in the plate 12 and is provided with an enlarged portion 17 for mounting the saw blade thereupon. The saw blade 14 is secured in such position by means of the nut 19, while the nut 20 with suitable washers is provided for the end of the stub shaft.

With the structure thus far described it will be seen that the electric motor will operate through the connections described so as to drive the saw blade upon an axis at 90° to that of the shaft 5. Furthermore it will be seen that this entire mechanism can be conveniently handled by the operator as it is applied to and moved through the work during the sawing operation.

Formed integrally with the housing 8 and also with the end plate 6 I have provided a stationary guard 21 for covering the upper portion of the saw blade, as clearly indicated in Fig. 1. This guard may be formed in any suitable manner so as to protect the operator against contact with the edge of the saw blade. That is to say, that portion of the guard which is nearest the saw blade may or may not be flanged on the two sides thereof for further protection of the operator. The stationary guard 21 is further provided with an extended portion 22 having the side flange 23, this extended portion being of a curved form for a purpose which will later appear. It will be obvious that this stationary guard extends approximately 180° about the edge of the saw blade or in other words approximately around the upper half of its periphery.

I have also provided a kerf blade 24 for the purpose of guiding the saw along the proper path as it is progressed through the work, this kerf blade following in the kerf cut by the saw. This kerf blade is therefore located immediately to the rear of the saw blade and extends partly thereabout so as to serve also to some degree as a guard for this portion of the saw blade. The kerf blade 24 is mounted upon the rear portion of the housing 8 or upon an integral extension thereof by means of screws 25 and 26.

I have provided also guarding means comprising an adjustable member 27 which serves as a depth gauge and also a guard to cover the lower portion of the saw blade between the kerf blade 24 and the lower portion of the upper guard 21, as well as a base or runner which slides along the work and forms the support for the tool during the sawing operation. The saw is thereby readily manipulated and is also afforded a guarding means extending substantially about its entire circumference. The adjustable member 27 is pivotally mounted upon the bolt 28, this same bolt 28 being employed for further securing the kerf blade in its fixed position. The member 27 is provided with a slot 27ª in the bottom and throughout the rear portion thereof so as to permit the projection of the saw blade therethrough as this member is adjusted upwardly for the cutting operation. The bifurcated rear end of member 27 also permits this member to be mounted so as to extend along the two sides of the kerf blade 24. With this form of structure, it is also possible to provide flanges 27ᵇ on both side edges of the member 27, thereby increasing the guarding effect of the same. This adjustable member 27 is normally forced to its lower position, illustrated in Fig. 1, by means of the spring 29 which is coiled about the screw 25 and which has its rear end portion 30 bearing against the end plate 6, while the forward end portion of the spring extends along and bears against the inside of the member 27, as clearly indicated in Fig. 1. The forward end of the adjustable member 27 is provided with an upwardly extending curved portion 31 which has the same degree of curvature as the extension 22 of the upper fixed guard member, so that these two corresponding front end portions of the upper and lower members may have sliding or telescoping engagement with each other.

Pivotally mounted upon the inwardly extending flange 32 provided on the front part 31 of the adjustable member 27, I have provided the lever arm 33 the lower end of which extends forwardly through opening 27ᶜ in the front end portion 31 of the adjustable member 27 and downwardly through an opening 27ᵈ provided in the projection 34 at the extreme forward end of the member 27. The upper end of the lever arm 33 carries a pin 35 having a head 35ª, this pin being surrounded by a coil spring 36 which is in compression between the adjacent portions of the member 27 and the lever 33. The front end portion 22 of the upper fixed guard member is provided with a slot 37 of substantially the same width as the diameter of the shank of the pin 35 but having an enlarged circular portion 38 at the lower end thereof of substantially the same diameter as the head 35ª. The toe 33ª of the lever arm 33 extends sufficiently beyond and below the guard member 27 in advance of the saw blade so that it can momentarily engage the work as the saw is applied thereto for the purpose of initially releasing the latch mechanism just now described. During the sawing operation, the member 27 will engage the work at a point slightly in advance of the vertical diameter of the saw blade as viewed in Fig. 1; so that the movement and manipulation of the saw are not interfered with by the projection of the toe 33ª. Moreover, the parts are so constructed and arranged that the toe 33ª is practically flush with the bottom of member 27 when it occupies position indicated in Fig. 6.

Upon pressing the toe 33ª against the edge of the work, the saw being pressed in a forward direction, the lever arm will be turned in a clockwise direction about its pivot point so as to force the head 35ª toward the right as viewed in Fig. 1, and out of the opening 38. The adjustable member 27 is then unlatched and free to move upwardly to the desired depth since the restricted portion of the pin 35 will pass along up through the corresponding slot 37, the head 35ª of the pin moving along the front face of the extended portion 22 of the upper fixed guard. The member 27, when adjusted upwardly in the manner described, is of course moved against the tension of the spring 29 and upon removing the saw from the work or upon releasing the pressure upon the adjustable member 27, it will be forced automatically downwardly to its closed or guarding position by virtue of the spring 29. As soon as the member 27 is returned to its lower position indicated in Fig. 1, the head 35ª which has at the same time been brought into registry with the enlarged opening 38, will be forced rearwardly or inwardly by means of the spring 36 so as to seat therein and thereby lock the member 27 in lower guarding position. Both the guard 27 and the latch or securing means therefor operate automatically in the sense that, without conscious control or effort by the operator and in all possible positions of the saw, when the blade is out of engagement with the work the guard is automatically moved to guarding position and the latch is automatically moved to guard latching or securing position.

As a means of limiting the movement of the member 27 and thereby determining the depth of the cut, I have provided an adjustable stop 39 which can be moved along in the slot 37 and clamped in any desired position. The stop 39 may be of any suitable form. The member 27 will thereby be limited in its upward movement by engagement of the pin 35 with the stop 39 and in this way will be permitted to move upwardly to only a predetermined degree according to the depth of cut desired.

By virtue of having the member 27 of a slotted or bifurcated form, there is afforded a more efficient bearing surface for engagement upon the work. That is to say, the member 27 engages the work on both sides of the saw blade, with the result of an increased degree of steadiness.

The adjustable member 27 while serving as a depth gauge, serves also as a guard member which automatically returns to guarding position, upon release of pressure by the operator, and is automatically locked in such position by means of the pin head 35ª engaging in the enlarged opening 38, as above explained. With this member actually locked in a guarding position, there is no danger of the same being accidently moved out of such position, as would otherwise be caused for instance by dropping the saw on the leg or other part of the operator. Because of the particular structure and arrangement of the member 27, it serves as a guard for practically the entire lower position of the saw blade between the kerf blade and the upper guard member.

Thus I have provided a comparatively simple saw structure which possesses the advantage of having a combined depth gauge and adjustable guard which co-operates with the kerf blade and an upper fixed guard member for protecting substantially the entire circumference of the saw blade against injury to the operator. Furthermore, I have provided a gauge and guard member, together with stop means for determining the degree of adjustment thereof.

The bifurcated form of gauge and guard member afford a more efficient bearing engagement with the work, and the effective automatic latching means makes it practically impossible for the saw blade to accidentally strike or injure the operator, this safeguard being further assured by the particular location of the toe of the lever 33 out of the zone of accidental contact by the operator.

Furthermore, with my improved arrangement of handles it is possible to handle and manipulate the saw with increased ease and effectiveness.

The combination of the side handle with the rear handle affording all the combined advantages of handles on both sides and a handle on the rear end. The rear handle is very useful in carrying the saw from place to place and at the same time serves the purpose of a side handle when used in conjunction with the single side handle shown for manipulating the saw during the sawing operation. With this arrangement the saw can be effectively and easily progressed forwardly through the work and also tilted to the proper degree with the same effectiveness and ease, such convenience and ease of manipulation being made possible by the angular arrangement of handle 3 in conjunction with the rear handle 2. The inclined handle 3 possesses the combined advantages of a handle arranged horizontally and one arranged vertically, and when combined with the rear handle 2, it is possible to carry the saw to the work by means of handle 2 and without removing the hand therefrom, it is merely necessary to grip the handle 3 with the other hand and then proceed at once with the manipulations incident to the sawing operation In use of the tool the stop for the depth gage is first set to the desired position, either to permit only a limited advance of the saw blade beyond the guard 27, or retreat of the guard to the maximum amount, according to the kind of work to be done. The saw is now grasped by its handles and is applied bodily to the work and the switch 2ª is actuated to start the motor. In the application of the tool to the work the trigger 33ª is either brought against its edge or engages its flat upper surface, but in either case, the first motion of advance of the tool along the work trips the trigger and permits the guard to retreat and the saw blade to enter the work to the desired depth. The tool is bodily moved along the work, the guard 27 then serving as a runner or base which slides on the work and serves as a support for the entire tool. In this manner the operation proceeds to completion, whereupon the tool is either lifted off from the work or the saw blade has passed its far edge. In any event, the first effect, upon removal of the tool from the work, is for the guard 27 to advance to guarding position, where it is promptly latched by the latching mechanism, and whether the blade is then stationary or rotatable, and no matter to what position the tool as a whole may be turned, the saw is guarded against injury thereby either to the person of the operator or any object with which it may come in contact.

What I claim is:

1. In a portable power driven hand tool adapted to be applied bodily to the work and moved along the same by the operator, a frame, a cutting blade operatively mounted thereon, a motor for operating said blade, guarding means movably mounted on said frame to advance or retreat to guard or expose a cutting portion of said blade, and comprising a base having a surface adapted to engage and travel along the work, automatic means effective in all tool positions and tending to advance said guarding means, and means also effective in all tool positions for automatically securing said guarding means against retreat.

2. In a power driven hand tool adapted to be applied bodily to the work and moved along the same by the operator, a frame, a cutting blade operatively mounted thereon, a motor for operating said blade, guarding means movably mounted on said frame to advance or retreat to guard or expose a cutting portion of said blade, and comprising a base and depth gage having a work engaging surface, means for limiting the retreat of said guarding means, automatic means effective in all tool positions and tending to advance said guarding means, and releasable means also effective in all tool positions for securing said guarding means against accidental retreat.

3. In a portable tool, a frame, a cutting blade operatively mounted thereon, means for operating said blade, guarding means adapted to advance or retreat to guard or expose a cutting portion of said blade, means tending to advance said guarding means, means for securing said guarding means against accidental retreat, and means adapted for actuation by engagement with the work for releasing said guarding means to allow the same to retreat.

4. In a portable tool, a frame, a cutting blade operatively mounted thereon, means for operating said blade, guarding means adapted to advance or retreat to guard or expose a cutting portion of said blade, means for securing said guarding means against accidental retreat, and means having a portion adapted to engage the work and operatable by motion of the tool across the work for releasing said securing means to thereby permit retreat of the guard.

5. In a power driven hand tool adapted to be slid along the work, a frame, a cutting blade operatively mounted thereon, means for operating said blade, guarding means movable on said frame to advance or retreat to guard or expose a cutting portion of said blade and having a face adapted to rest upon the work, means for limiting the retreat of said guarding means, means automatically tending to advance said guarding means, means for automatically securing said guarding means against accidental retreat, and means projecting beyond said face and adapted for movement across the same for releasing said guarding means to thereby permit its retreat.

6. In a portable tool, a frame, a cutting blade operatively mounted thereon, means for operating said blade, guarding means adapted to advance or retreat to guard or expose a cutting portion of said blade, and releasable means for securing said guarding means against accidental retreat, said releasable means including a tripping member located in advance of the cutting blade in position to engage the work to be cut to thereby release said securing means and permit said guarding means to retreat.

7. In a portable tool, a frame, a cutting blade operatively mounted thereon, means for operating said blade, a movable guard adapted to advance or retreat to guard or expose a cutting portion of said blade, and releasable means for securing said guarding means against accidental retreat, said releasable means including a member mounted upon said guard and movable therewith and adapted for engagement with the work to thereby release said securing means and permit said guard to retreat.

8. In a power driven hand tool adapted to be slid along the work, a frame, a cutting blade operatively mounted thereon, means for operating said blade, said frame having a guard for guarding a portion of said blade, guarding means pivotally mounted to advance or retreat in overlapping relation with said guard to guard or expose a cutting portion of said blade and having a work engaging surface, said guard and said movable guarding means cooperating to guard cutting portions of said blade not projecting into said work, means effective in all tool positions and operative between said frame and said guarding means to automatically advance the latter, and means also effective in all tool positions for automatically securing said guarding means in fully advanced position.

9. In a saw structure, the combination of a frame, a saw operatively mounted upon said frame, means for operating said saw, a kerf blade mounted upon said frame, an adjustable guard also mounted upon said frame, said kerf blade and adjustable guard cooperating together as combined guard means while the saw is out of work cutting position, spring means effective in all tool positions for urging said guard toward said cooperating position, and releasable means also effective in all tool positions for positively retaining said guard in said position.

In testimony whereof I hereby affix my signature.

JOHN M. CROWE.